UNITED STATES PATENT OFFICE.

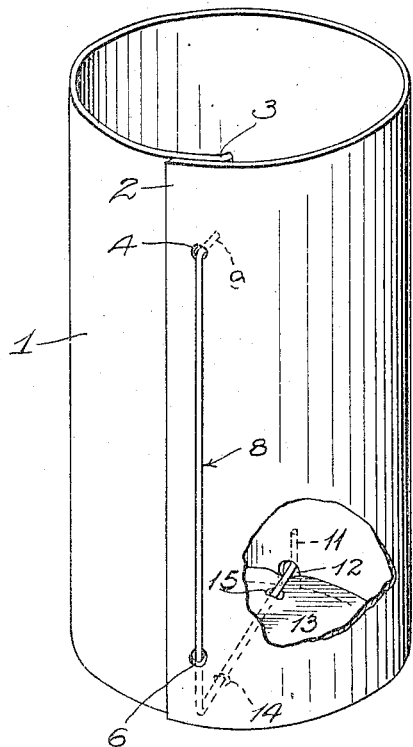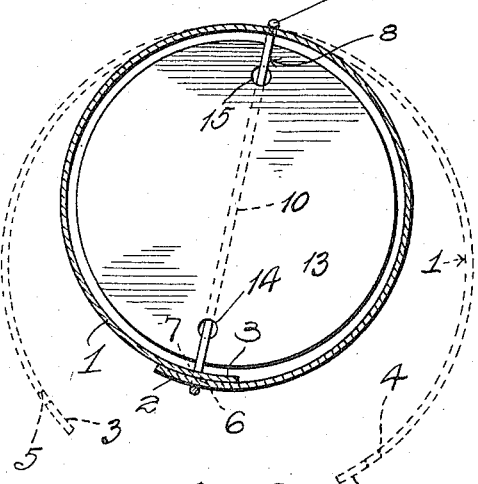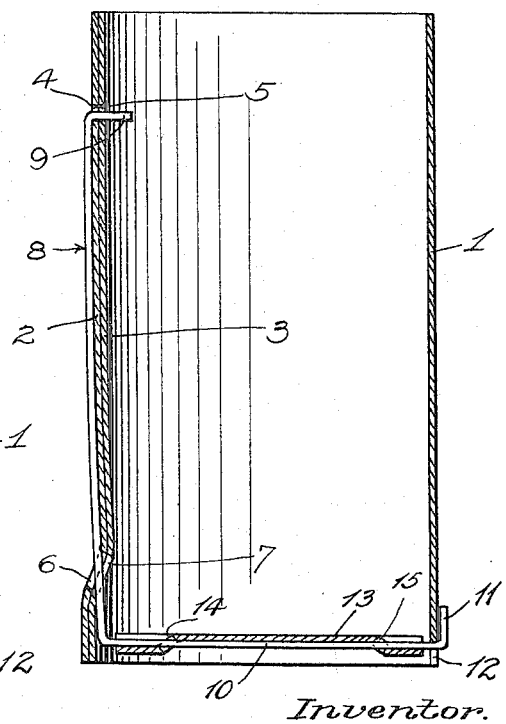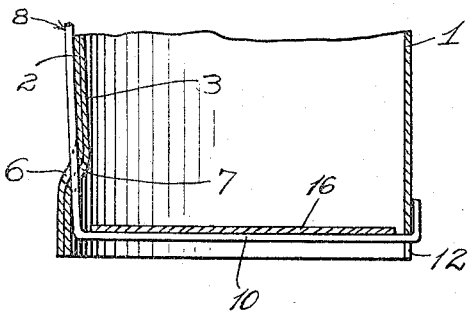

AMOS M. COX, OF LOS ANGELES, CALIFORNIA.

TRANSPLANTING-POT.

1,197,106.  Specification of Letters Patent.  Patented Sept. 5, 1916.

Application filed December 4, 1915. Serial No. 65,019.

*To all whom it may concern:*

Be it known that I, AMOS M. COX, a citizen of the United States, residing at Los Angeles, in the county of Los Angeles and State of California, have invented certain new and useful Improvements in Transplanting-Pots, of which the following is a specification.

This invention relates to improvements in knock-down receptacles and more especially in receptacles of this kind which are adapted for use as flower pots and the like.

It is an object of the invention to provide a knock-down receptacle in which the walls thereof may be made of a piece of suitable material folded or lapped to make a receptacle of the desired size and shape, and to provide a single locking member for holding the material in its shaped form.

It is also an object of the invention to provide a transplanting pot made up of a piece of material shaped in approximately cylindrical form so that its opposite edges may be lapped or folded upon each other, said edges having apertures therein, and also comprising a locking member made up of a metallic piece bent to engage the said apertures and to form a cross support in the bottom of the receptacle.

It is a further object of the invention to provide a transplanting flower pot made up of a single piece of material rolled and lapped at the edges and having coinciding apertures therein and to secure the said lapping edges by means of a bent wire adapted to be threaded through said apertures and to extend across one end of the rolled material to form a bottom support and locking means, one end of said wire being made to engage a holding recess or slot in the rolled material.

In the accompanying drawing forming a part of this specification:

Figure 1 is a perspective view of a knock-down receptacle or flower pot made in accordance with this invention. Fig. 2 is a horizontal transverse sectional view through the said receptacle, the walls or rolled part thereof being shown as spread apart, in dotted lines, as when the pot is taken off from a plant. Fig. 3 is a vertical central sectional view through the said receptacle or pot, the locking member being shown in side elevation. Fig. 4 is a similar detail sectional view of the lower portion of a pot, but showing the bottom merely resting upon the locking member.

It is the purpose of the present invention to provide a simple economical folding or knock-down receptacle or pot formed of material of any suitable kind which may be bent and rolled or otherwise shaped so that its edges may be lapped and secured together. It is particularly intended to provide a receptacle of this character which is especially adapted for use as a transplanting pot, the device being readily removable from the earth and roots of a plant when it is desired to transplant the same.

A preferred form of the device has been illustrated in the drawing and the details and features of the invention will now be more specifically described reference being had to the said drawing.

In the drawing 1 indicates the pot or wall portion of the receptacle or transplanting pot, which is preferably made of a single piece of material, such for instance as paper, sheet metal or the like. The material is rolled or otherwise shaped so that its opposite edges 2 and 3 may be lapped upon each other. A cylindrical shape such as shown in the drawings is well suited for the purposes of such a transplanting pot ordinarily, though of course it will be understood that the wall portion 1 of the device may be folded to produce various shapes in cross section as for instance square, triangular or other many sided forms. In any event the lapping portions 1 and 2 are preferably provided with coinciding apertures 4, 5, 6 and 7 which when brought into coincidence may receive any suitable locking member 8. The locking member is usually in the form of a metallic piece or wire having its upper end bent at 9 so as to extend through the apertures 4 and 5, while its lower portion is bent transversely to form a bottom supporting bar 10, which usually extends across the lower end of the receptacle or pot formed. One end of the bar portion 10 is turned upwardly at 11 so as to engage the outer surface of the pot for holding the locking piece in position and bracing the parts. The said end 11 is usually sprung into engagement with a recess or slot 12 formed in the lower edge of the pot wall, as clearly shown in the drawing. It will be evident that any kind of metallic piece, as a bar, round, flat or other shaped wire may be employed for forming said locking member within the scope of the invention.

The bottom supporting bar 10 may be used as the only support at the bottom of the pot if desired, and is sufficiently effective for this purpose if the pot is a small one. When using larger pots however, it is ordinarily an advantage to place earth holding means upon said supporting bar 10 of any desired kind. As shown in Fig. 3 a bottom piece or floor 13 may be employed if desired and by providing it with apertures 14 and 15, the bar 10 may be threaded therethrough so as to effectively hold the said bottom piece or floor in position. The said bottom piece may however, be made by simply laying a piece of suitable material 16 loosely upon the said bar 10 as clearly shown in Fig. 4. It will be evident that any shaped bottom piece may be used and that it may be made small enough to be readily inserted in the bottom of the receptacle or pot. It is not necessary ordinarily to make a close joint around the edges of the bottom, but is in fact usually preferably to leave some space between the edges of said bottom piece and the side walls of the receptacle or pot.

In using the pot for transplanting purposes, the plant is placed in the pot after its walls have been rolled and locked by the insertion of the locking member 8, any suitable bottom having been employed, or merely the bar 10 used for the support of the contents of the said pot. The earth for the plant is filled in around the roots thereof within the pot. When it is necessary to do transplanting, the pot can be readily taken off from the roots and soil without disturbing the same, merely by unlocking the upper end 9, springing it out of the holes 4 and 5 and pulling the locking member longitudinally from apertures 6, and 7 and out of the recess 12. The wall portion of the pot may then be unwound or opened as indicated in dotted lines in Fig. 2 and thus easily removed. The bar portion 10 is preferably bent at such an angle with respect to the upright portion of the member 8 as to make it necessary to spring the bar slightly, in getting it into the recess 12, whereby it will firmly hold the parts in position without danger of displacement.

While I contemplate making the receptacle of various materials, I preferably make the same of a suitable paper, such for instance as roofing paper or material which is water proof and rust proof. The pot may however be made with great advantage of various kinds of thin metal if preferred all within the spirit and scope of this invention.

It will be evident that the pot may be put together again and used over and over.

What is claimed is:

1. A transplanting pot made of a single piece of material rolled and lapped at its edges, a locking member adapted to secure its edges together and extending across one end of the pot to support the contents thereof.

2. A transplanting pot comprising a flexible material rolled to form a receptacle and having its edges brought together, a wire bent to secure said edges and having a transverse portion adapted to support the contents of the pot and means for securing the end of said supporting portion.

3. A transplanting pot comprising a piece of water and rust proof material rolled so as to lap its opposite edges, said edges having coinciding apertures therein, a locking member of wire bent to extend through said apertures and having its lower portion bent at an angle to its upright portion to extend across the bottom of the pot, one end of said bottom portion being bent upwardly to engage the wall of the pot, said wall having a recess to receive the same, and a bottom piece carried by said wire.

4. A knock-down pot formed of material bent to bring its edges together, a locking member penetrating the said edges and holding them together, the said member being bent and extended across the receptacle at the bottom to support the contents of the pot and a bottom piece, having apertures therein, for engaging the said member and supporting the contents of the pot.

In testimony whereof, I have hereunto set my hand, in presence of two witnesses.

AMOS M. COX.

Witnesses:
 CASSELL SEVERANCE,
 EARLE R. POLLARD.

Copies of this patent may be obtained for five cents each, by addressing the "Commissioner of Patents, Washington, D. C."